US011835982B2

(12) United States Patent
Lin et al.

(10) Patent No.: US 11,835,982 B2
(45) Date of Patent: Dec. 5, 2023

(54) PORTABLE COMPUTING DEVICE

(71) Applicant: ASUSTeK COMPUTER INC., Taipei (TW)

(72) Inventors: Hao-Hsuan Lin, Taipei (TW); Yu-Hsiu Su, Taipei (TW); Chun-Nan Wang, Taipei (TW); Jia-Ying Wu, Taipei (TW); Chia-Sen Chang, Taipei (TW); Yu-Cheng Shen, Taipei (TW); Shih-Hsiang Kao, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 17/669,334

(22) Filed: Feb. 10, 2022

(65) Prior Publication Data

US 2022/0283627 A1 Sep. 8, 2022

(30) Foreign Application Priority Data

Mar. 4, 2021 (TW) .................................. 110107783

(51) Int. Cl.
*G06F 1/32* (2019.01)
*G06F 1/3287* (2019.01)
*G06F 1/324* (2019.01)
*G06F 1/3212* (2019.01)

(52) U.S. Cl.
CPC ............ *G06F 1/3287* (2013.01); *G06F 1/324* (2013.01); *G06F 1/3212* (2013.01)

(58) Field of Classification Search
CPC ....... G06F 1/3287; G06F 1/3212; G06F 1/324
See application file for complete search history.

(56) References Cited

U.S. PATENT DOCUMENTS

| 7,069,463 | B2 | 6/2006 | Oh |
| 9,280,196 | B2 | 3/2016 | Yu et al. |
| 2004/0104709 | A1* | 6/2004 | Yamaji .................. G06F 1/3287 320/150 |
| 2014/0380073 | A1* | 12/2014 | Yu .......................... G06F 1/324 713/322 |

FOREIGN PATENT DOCUMENTS

| CN | 1360241 | 7/2002 |
| CN | 1452043 | 10/2003 |
| TW | 201500907 | 1/2015 |

\* cited by examiner

*Primary Examiner* — Stefan Stoynov
(74) *Attorney, Agent, or Firm* — JCIPRNET

(57) ABSTRACT

A portable computing device including a central processing unit (CPU) and a controller is provided. The controller is coupled between the CPU, a graphics processing unit, and a battery module. The controller determines whether to adjust performance of the CPU and the graphics processing unit according to at least one of a battery capacity, a battery power, a battery current, a battery voltage, or a battery temperature of the battery module.

12 Claims, 7 Drawing Sheets

PORTABLE COMPUTING DEVICE

CROSS-REFERENCE TO RELATED APPLICATION

This application claims the priority benefit of Taiwan application serial No. 110107783, filed on Mar. 4, 2021. The entirety of the above-mentioned patent application is hereby incorporated by reference herein and made a part of the specification.

BACKGROUND OF THE INVENTION

Field of the Invention

The disclosure relates to a portable computing device.

Description of the Related Art

Currently, a portable computing device is operated in a transformer mode or a battery mode. In the battery mode, when the system power consumption is greater than the designed battery capability, the system performance is directly reduced to the minimum or is gradually reduced to ensure that the battery continues supplying power for operation. Therefore, a user feels obviously frustrated due to the reduced system performance during operation (such as playing video games), resulting in a poor user experience. Therefore, how to suppress the frustration caused by the reduced system performance in the battery mode has become a focus of improving user experience.

BRIEF SUMMARY OF THE INVENTION

According to an aspect of the disclosure, the disclosure a portable computing device is provided, which includes a central processing unit (CPU) and a controller. The controller is coupled between the CPU, a graphics processing unit, and a battery module. The controller determines whether to adjust performance of at least one of the CPU or the graphics processing unit according to one or a combination of a battery capacity, a battery power, a battery current, a battery voltage, or a battery temperature of the battery module. When the controller determines that one or a combination of the battery capacity, the battery power, the battery current, the battery voltage, or the battery temperature of the battery module meets a reduction condition, the controller reduces the performance of at least one of the CPU or the graphics processing unit. When the controller determines that one or a combination of the battery capacity, the battery power, the battery current, the battery voltage, or the battery temperature of the battery module meets a restoration condition, the controller restores the performance of at least one of the CPU or the graphics processing unit.

Based on the above, the portable computing device provided in the disclosure performs a performance control method through the controller to gradually reduce or restore the performance of the CPU or the graphics processing unit. In this way, optimal settings are made between the system performance and the capability of the battery module, so that program execution remains smooth while the service life of the battery module is ensured, and a better user experience is provided.

To make the features and advantages of the disclosure clear and easy to understand, the following gives a detailed description of embodiments with reference to accompanying drawings.

DETAILED DESCRIPTION OF THE EMBODIMENTS

Figure 1:
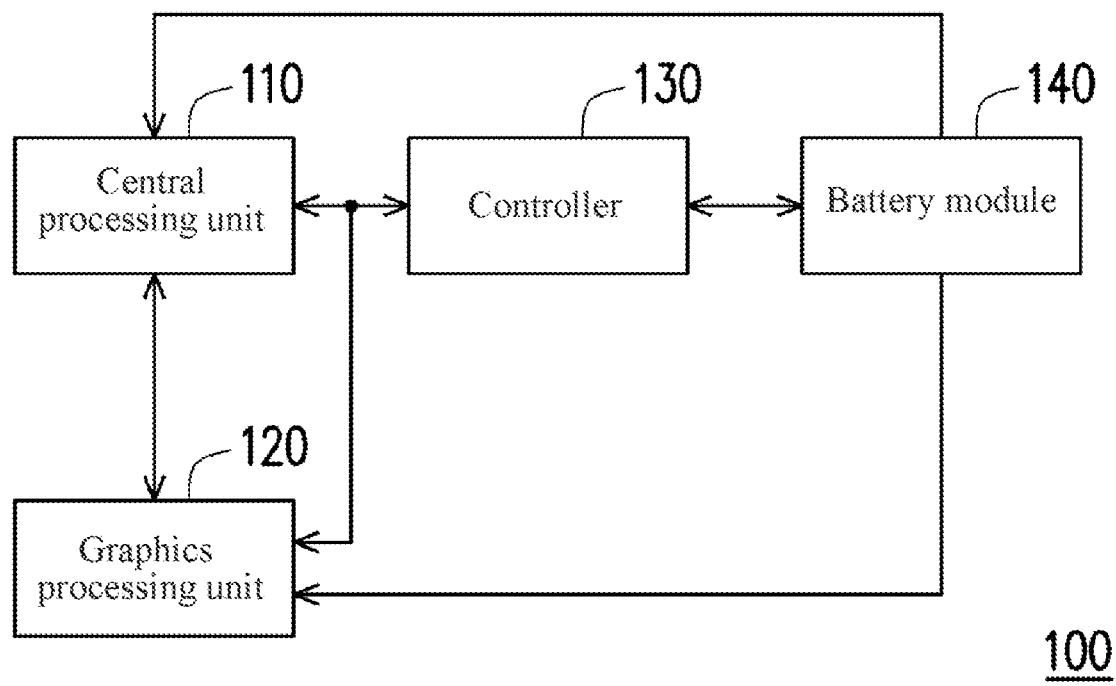
FIG. 1 is a schematic diagram of a system of a portable computing device according to an embodiment of the disclosure.

Referring to FIG. 1, in an embodiment, a portable computing system 100 includes a central processing unit (CPU) 110, a graphics processing unit 120, a controller 130, and a battery module 140. The controller 130 is coupled between the CPU 110, the graphics processing unit 120, and the battery module 140, and the battery module 140 is coupled to the CPU 110 and the graphics processing unit 120 to provide power (such as a voltage source and/or a current source) to the CPU 110 and the graphics processing unit 120. A portable computing device (such as the portable computing devices 101 to 104 shown in FIG. 5A to FIG. 5D) includes at least the CPU 110 and the controller 130.

Figure 2:
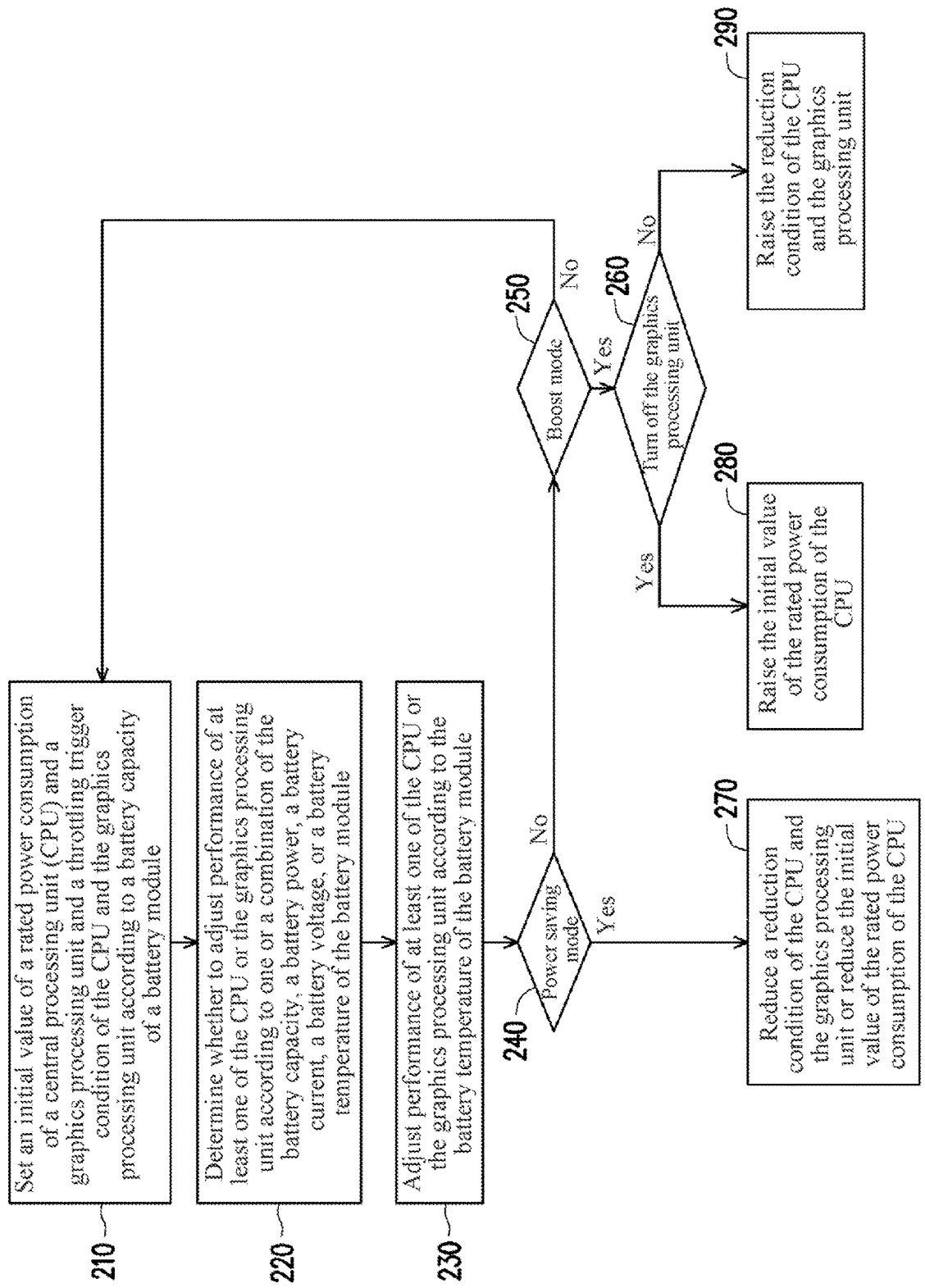
FIG. 2 is a flowchart of performance adjustment of a portable computing device according to an embodiment of the disclosure.

In an embodiment, the controller 130 determines whether to adjust performance of at least one of the CPU 110 or the graphics processing unit 120 according to one or a combination of a battery capacity, a battery power, a battery current, a battery voltage, or a battery temperature of the battery module 140. Referring to FIG. 2, when step 210 is performed, the controller 130 sets an initial value of a rated power consumption of the CPU 110 and the graphics processing unit 120 and a throttling trigger condition of the CPU 110 and the graphics processing unit 120 according to the battery capacity of the battery module 140, where the throttling of the CPU 110 and the graphics processing unit 120 is triggered by a voltage level of pins of a chip, and the initial values of the rated power consumption of the CPU 110 and the graphics processing unit 120 are stored through a register of the chip. When step 220 is performed, the controller 130 determines whether to adjust the performance of at least one of the CPU 110 or the graphics processing unit 120 according to one or a combination of the battery capacity, the battery power, the battery current, the battery voltage, and the battery temperature of the battery module 140. When step 230 is performed, the controller 130 adjusts the performance of at least one of the CPU 110 or the graphics processing unit 120 according to the battery temperature of the battery module 140.

Figure 3A:
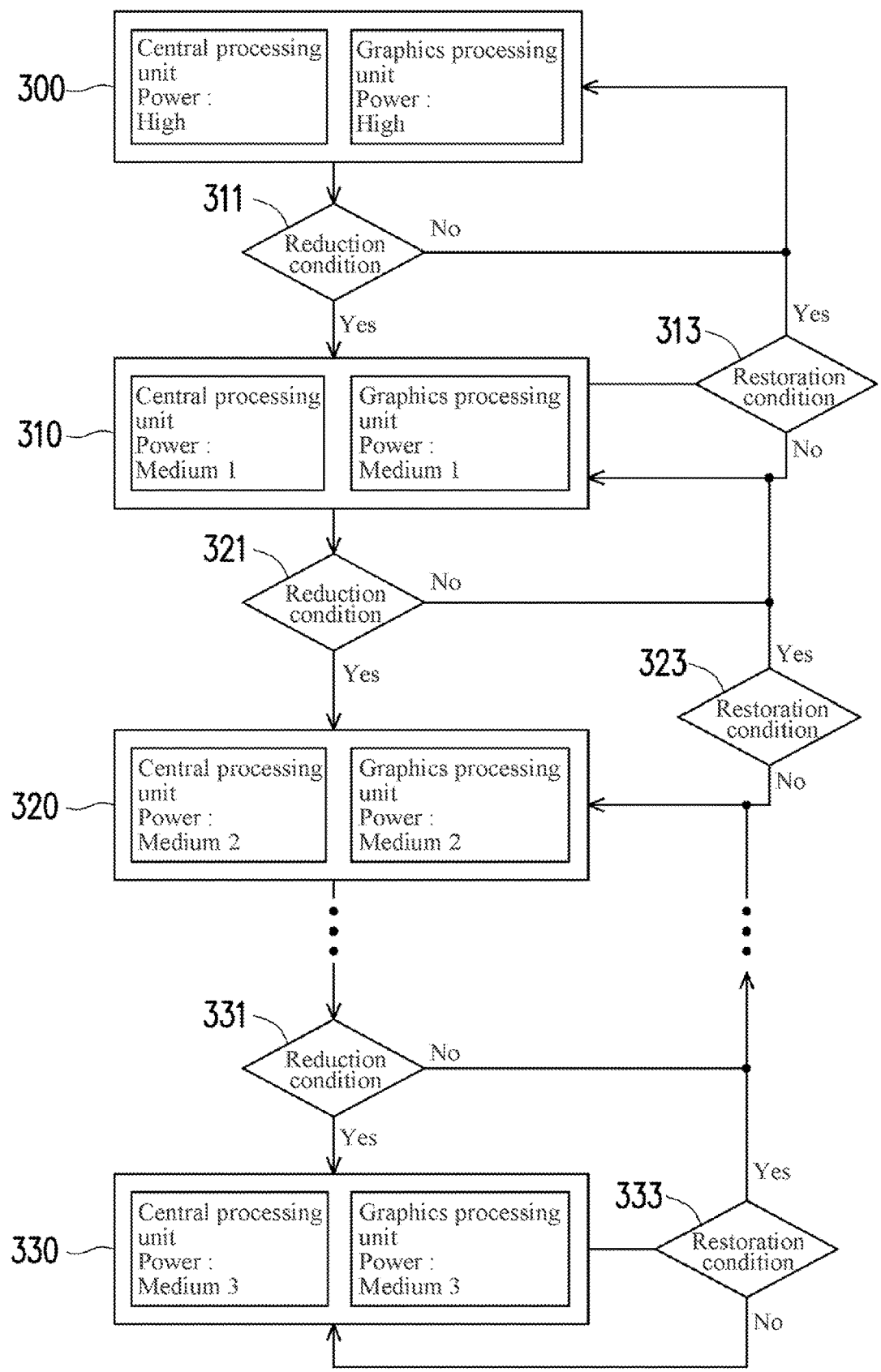
FIG. 3A is an embodiment of step 230 in FIG. 2.
Figure 3B:
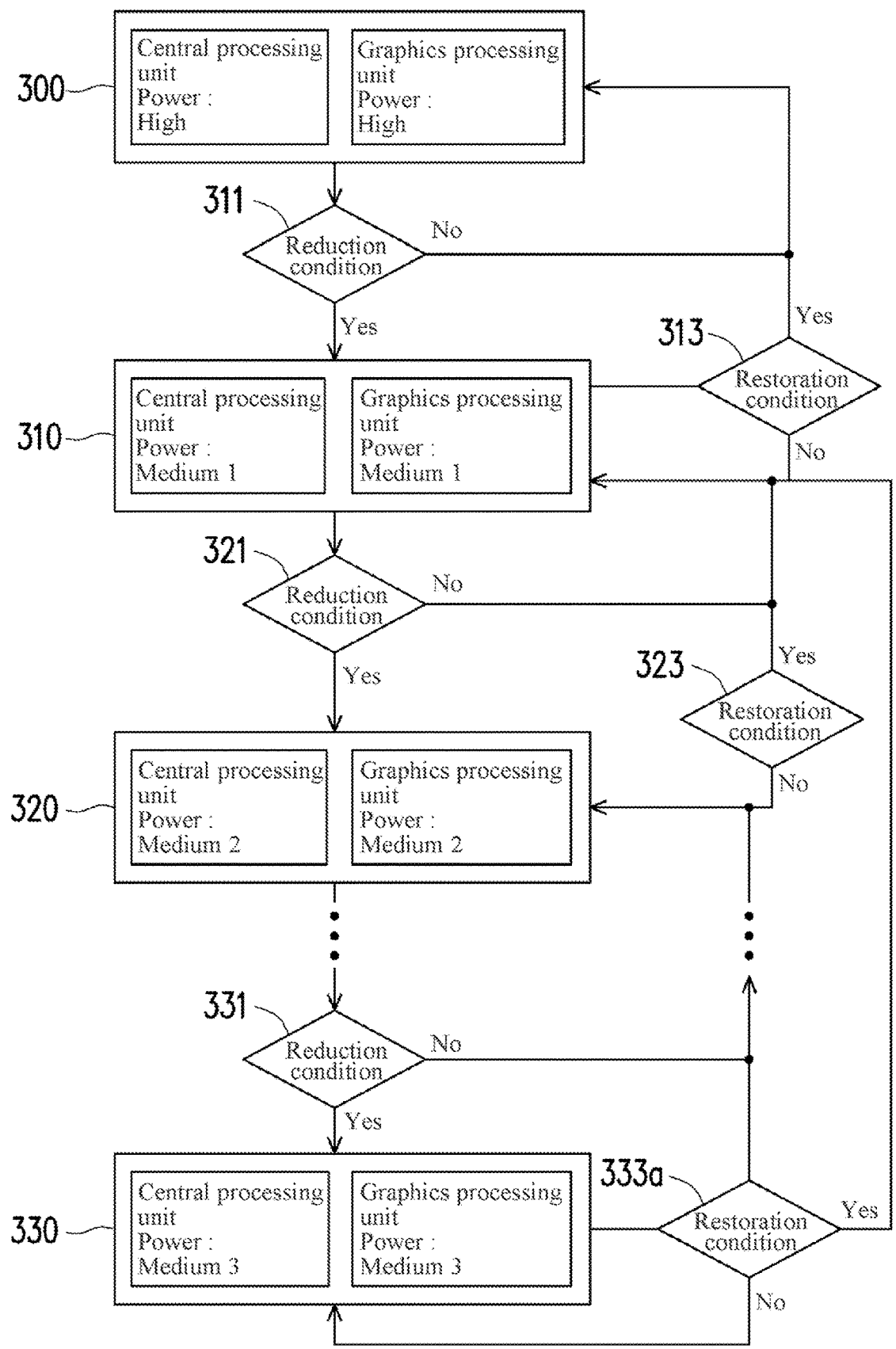
FIG. 3B is another embodiment of step 230 in FIG. 2.

Referring to FIG. 2, FIG. 3A, and FIG. 3B together, FIG. 3A is an embodiment of step 230 in FIG. 2. FIG. 3B is another embodiment of step 230 in FIG. 2. In step 220, the controller 130 adjusts the performance of at least one of the CPU 110 or the graphics processing unit 120 by performing a performance control method in FIG. 3A or FIG. 3B. Specifically, the performance control method in FIG. 3A or FIG. 3B includes a plurality of performance reduction steps and a plurality of performance restoration steps, and each performance reduction step and each performance restoration step respectively correspond to a performance control setting. Therefore, when the controller 130 determines that one or a combination of the battery capacity, the battery power, the battery current, the battery voltage, or the battery temperature of the battery module 140 meets a reduction condition, the controller 130 reduces the performance of at least one of the CPU 110 or the graphics processing unit 120. When the controller 130 determines to reduce the performance of at least one of the CPU 110 or the graphics processing unit 120, the controller 130 changes a current performance setting of the CPU 110 and the graphics processing unit 120 from a maximum performance setting to one of the plurality of performance control settings by performing at least one of the performance reduction steps, to gradually reduce the performance of at least one of the CPU 110 or the graphics processing unit 120 until one or a combination of the battery capacity, the battery power, the battery current, the battery voltage, or the battery temperature of the battery module 140 matches a preset safe value, where the maximum performance setting and the performance control settings respectively correspond to different performance indexes, and the maximum performance setting has a maximum performance index.

Similarly, when the controller 130 determines that one or a combination of the battery capacity, the battery power, the battery current, the battery voltage, or the battery temperature of the battery module 140 meets a restoration condition, the controller 130 restores the performance of at least one of the CPU 110 or the graphics processing unit 120. When the controller 130 determines to restore the performance of at least one of the CPU 110 or the graphics processing unit 120, the controller 130 changes the current performance setting from a current performance control setting in the performance control settings to another performance control setting whose performance index is higher than that of the current performance control setting in the performance control settings by performing at least one of the performance restoration steps, or further, changes the current performance setting from another performance control setting to the maximum performance setting with the maximum performance index, to gradually increase the performance of at least one of the CPU 110 or the graphics processing unit 120. In other words, when the performance of the CPU 110 and the graphics processing unit 120 is restored, the performance of the CPU 110 and the graphics processing unit 120 only stays in a state corresponding to a performance control setting adopted by the controller 130, and does not necessarily return to a maximum performance state.

In an embodiment, the controller 130 adjusts the performance of at least one of the CPU 110 or the graphics processing unit 120 by performing a performance control method in FIG. 3A or FIG. 3B, or directly performs throttling on the CPU 110 or the graphics processing unit 120 to control the performance of the CPU 110 and the graphics processing unit 120.

Referring to FIG. 3A, in this embodiment, the portable computing device includes at least the CPU 110 and the controller 130 shown in FIG. 1. It is assumed that the portable computing device uses a maximum performance setting 300 after being initialized. Next, in step 311, the controller 130 determines whether a current system state of the portable computing device (that is, one or a combination of the battery capacity, the battery power, the battery current, the battery voltage, or the battery temperature of the battery module 140) meets a reduction condition. When the current system state meets the reduction condition, that is, in step 311, a determining result is "Yes", the controller 130 changes the current performance setting from the maximum performance setting 300 to a first performance control setting 310 to reduce the performance of at least one of the CPU 110 or the graphics processing unit 120; and when the current system state does not meet the reduction condition, that is, in step 311, a determining result is "No", the controller 130 maintains the maximum performance setting 300. In an embodiment, the reduction condition is that the battery current is greater than a first preset current value (for example: 7 amperes) and lasts for a preset period of time (for example: 1 second).

On the other hand, in step 313, in a case that the current performance setting is the first performance control setting 310, whether the current system state meets a restoration condition is determined. When the current system state meets the restoration condition, that is, in step 313, a determining result is "Yes", the controller 130 changes the current performance setting from the first performance control setting 310 back to the maximum performance setting 300 to restore the performance of at least one of the CPU 110 or the graphics processing unit 120; and when the current system state does not meet the restoration condition, that is, in step 313, a determining result is "No", the controller 130 maintains the first performance setting 310. In an embodiment, the restoration condition is that the battery current is less than a second preset current value (for example: 5 amperes) for a preset period of time (for example: 1 second).

In step 321, whether the current system state meets the reduction condition is determined. When the current system state meets the reduction condition, that is, in step 321, a determining result is "Yes", the controller 130 changes the current performance setting from the first performance control setting 310 to a second performance control setting 320 with a lower performance index than that of the first performance control setting 310 to further reduce the performance of the CPU 110 and the graphics processing unit 120; and when the current system state does not meet the reduction condition, that is, in step 321, a determining result is "No", the controller 130 maintains the first performance control setting 310.

On the other hand, in step 323, in a case that the current performance setting is the second performance control setting 320, whether the current system state meets the restoration condition is determined. When the current system state meets the restoration condition, that is, in step 323, a determining result is "Yes", the controller 130 changes the current performance setting from the second performance control setting 320 back to the first performance control setting 310 to restore the performance of at least one of the CPU 110 or the graphics processing unit 120; and when the current system state does not meet the restoration condition, that is, in step 323, a determining result is "No", the controller 130 maintains the second performance control setting 320.

Next, in step 331, whether the current system state meets the reduction condition is determined. When the current system state meets the reduction condition, that is, in step 331, a determining result is "Yes", the controller 130 sets the current performance setting from a performance control setting with a higher performance index (for example, the second performance control setting 320) to a third performance control setting 330 with a lower performance index to further reduce the performance of the CPU 110 and the graphics processing unit 120; and when the current system state does not meet the reduction condition, that is, in step 331, a determining result is "No", the controller 130 maintains the performance control setting with the higher performance index (for example, the second performance control setting 320).

On the other hand, in step 333, in a case that the current performance setting is the third performance control setting 330, whether the current system state meets the restoration condition is determined. When the current system state meets the restoration condition, that is, in step 333, a determining result is "Yes", a processor changes the current performance setting from the third performance control setting 330 back to the performance control setting with the higher performance index (for example, the second performance control setting 320) to restore the performance of the CPU 110 and the graphics processing unit 120; and when the current system state does not meet the restoration condition, that is, in step 333, a determining result is "No", the processor maintains the third performance control setting 330.

In an embodiment, steps 311, 321, and 331 are performance reduction steps, and steps 313, 323, and 333 are performance restoration steps, where steps 311, 321, and 331 are performed together with steps 313, 323, and 333, or steps 311, 321, and 331 or steps 313, 323, and 333 are selectively performed, which is determined by a person of ordinary skill in the art.

Referring to FIG. 3B, steps in FIG. 3B are roughly the same as those in FIG. 3A, and a difference from FIG. 3A is that in step 333*a*, whether the current system state meets the restoration condition is determined. When the controller 130 determines that the current system state meets the restoration condition, that is, in step 333, a determining result is "Yes", the processor changes the current performance setting from the third performance control setting 330 back to the first performance control setting 310 to restore the performance of the CPU 110 and the graphics processing unit 120.

Referring to FIG. 2 again, when step 230 is performed, the controller 130 determines, according to the battery temperature of the battery module 140, whether to perform one of reducing a rated power consumption of the graphics processing unit 120, triggering throttling of the graphics processing unit 120, reducing a rated power consumption of the CPU 110, triggering throttling of the CPU 110, or enabling the portable computing system 100 (or the portable computing device) to enter a dormant state.

Figure 4:
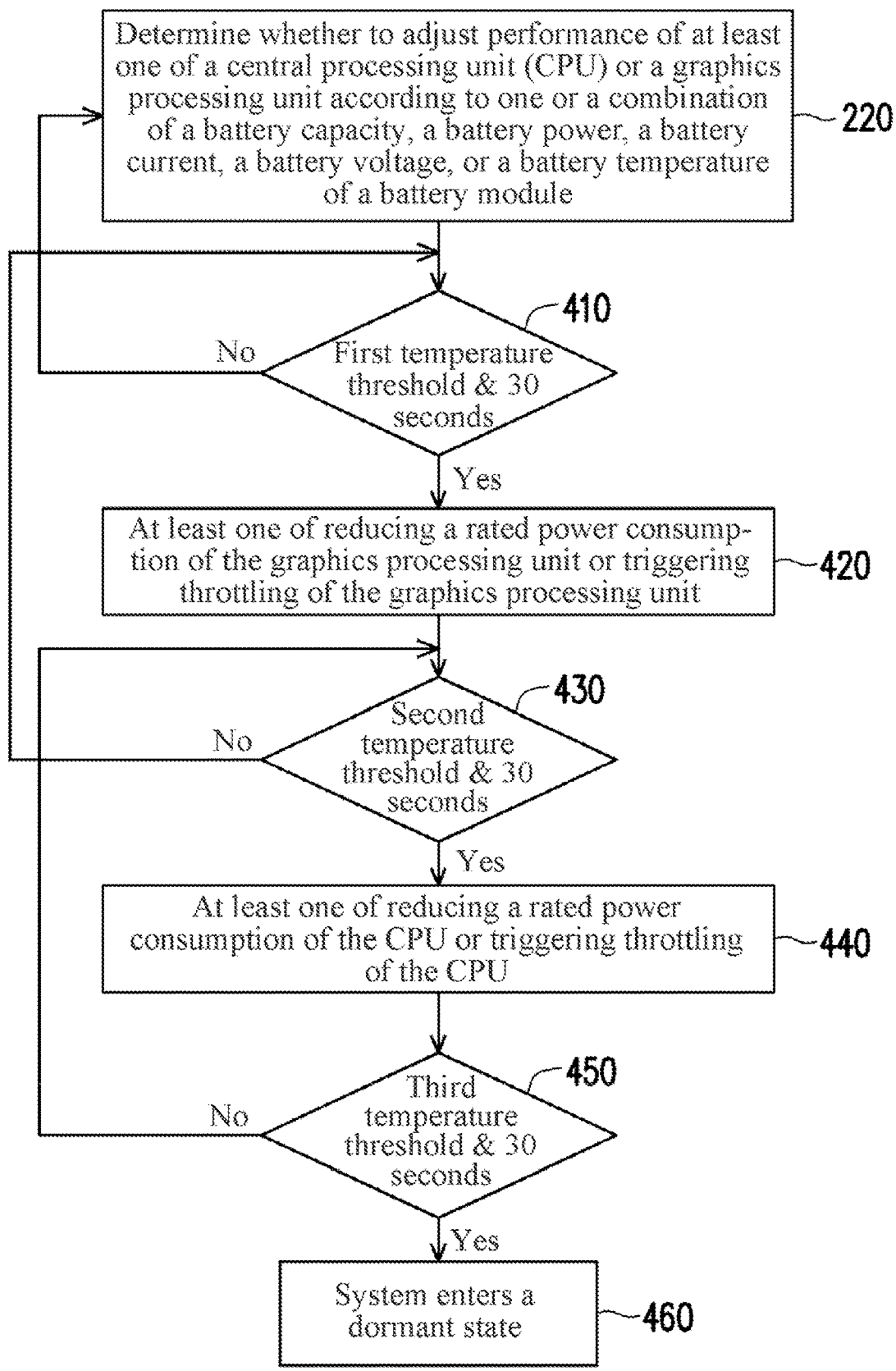
FIG. 4 is still another embodiment of step 230 in FIG. 2.

Referring to both FIG. 2 and FIG. 4, FIG. 4 is an embodiment of step 230 in FIG. 2. In step 410, the controller 130 determines whether the battery temperature is greater than or equal to a first temperature threshold for a first preset period of time (for example, 30 seconds). When the battery temperature is less than the first temperature threshold for 30 seconds, the current performance settings of the CPU 110 and the graphics processing unit 120 are maintained when step 220 in FIG. 2 is performed. When the battery temperature is greater than or equal to the first temperature threshold for 30 seconds, step 420 is performed to perform at least one of reducing the rated power consumption of the graphics processing unit 120 or triggering the throttling of the graphics processing unit 120.

In step 430, the controller 130 determines whether the battery temperature is greater than or equal to a second temperature threshold for a second preset period of time (for example, 30 seconds), where the second temperature threshold is greater than the first temperature threshold, and the second preset period of time is the same as or different from the first preset period of time. When the battery temperature is less than the second temperature threshold, go back to step 410. When the battery temperature is greater than or equal to the second temperature threshold for 30 seconds, step 440 is performed to perform at least one of reducing the rated power consumption of the CPU 110 or triggering the throttling of the CPU 110.

In step 450, the controller 130 determines whether the battery temperature is greater than or equal to a third temperature threshold for a third preset period of time (for example, 30 seconds), where the third temperature threshold is greater than the second temperature threshold, and the third preset period of time is the same as or different from the first preset period of time and the second preset period of time. When the battery temperature is less than the third temperature threshold, go back to step 430. When the battery temperature is greater than or equal to the third temperature threshold for 30 seconds, step 460 is performed to enable the portable computing system 100 (or the portable computing device) to enter a dormant state.

Referring to FIG. 2 again, when step 240 is performed, the controller 130 further determines whether the portable computing system 100 (or the portable computing device) is operated in a power saving mode. When it is determined that the portable computing system 100 is operated in the power saving mode, that is, in step 240, a determining result is "Yes", step 270 is performed. In step 270, the controller 130 reduces the reduction condition in the performance control method in FIG. 3A or FIG. 3B (for example, changes the reduction condition from "battery current greater than 7 amperes and lasting for 1 second" to "battery current greater than 6 amperes and lasting for 1 second",), or reduces the initial value of the rated power consumption of the CPU 110. When it is determined that the portable computing system 100 is not operated in the power saving mode, that is, in step 240, a determining result is "No", step 250 is performed. In step 250, the controller 130 determines whether the portable computing system 100 (or the portable computing device) is operated in a boost mode. When the portable computing device is not operated in the boost mode, that is, in step 250, a determining result is "No", step 210 is performed; When the portable computing device is operated in the boost mode, that is, in step 250, a determining result is "Yes", step 260 is performed to determine whether the portable computing system 100 (or the portable computing device) turns off the graphics processing unit (that is, operates in a built-in display mode).

When the portable computing device turns off the graphics processing unit 120, that is, in step 260, a determining result is "Yes", step 280 is performed to raise the initial value of the rated power consumption of the CPU 110. When the portable computing device does not turn off the graphics processing unit 120, that is, in step 260, a determining result is "No", step 290 is performed. The controller 130 raises the reduction condition in the performance control method in FIG. 3A or FIG. 3B (for example, changes the reduction condition from "battery current greater than 7 amperes and lasting for 1 second" to "battery current greater than 8 amperes and lasting for 1 second").

In an embodiment, a user sets whether to enter the power saving mode through an operating system, or sets a condition for entering the power saving mode.

Figure 5A:
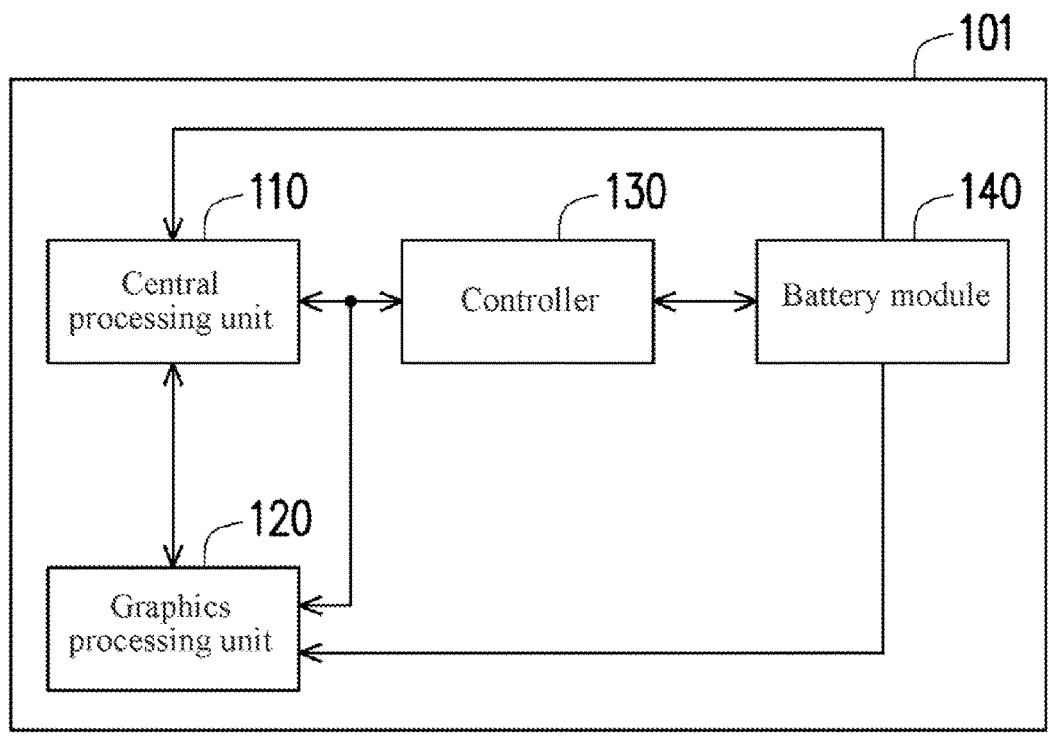
FIG. 5A to FIG. 5D are schematic diagrams of a system of a portable computing device according to an embodiment of the disclosure.
Figure 5B:
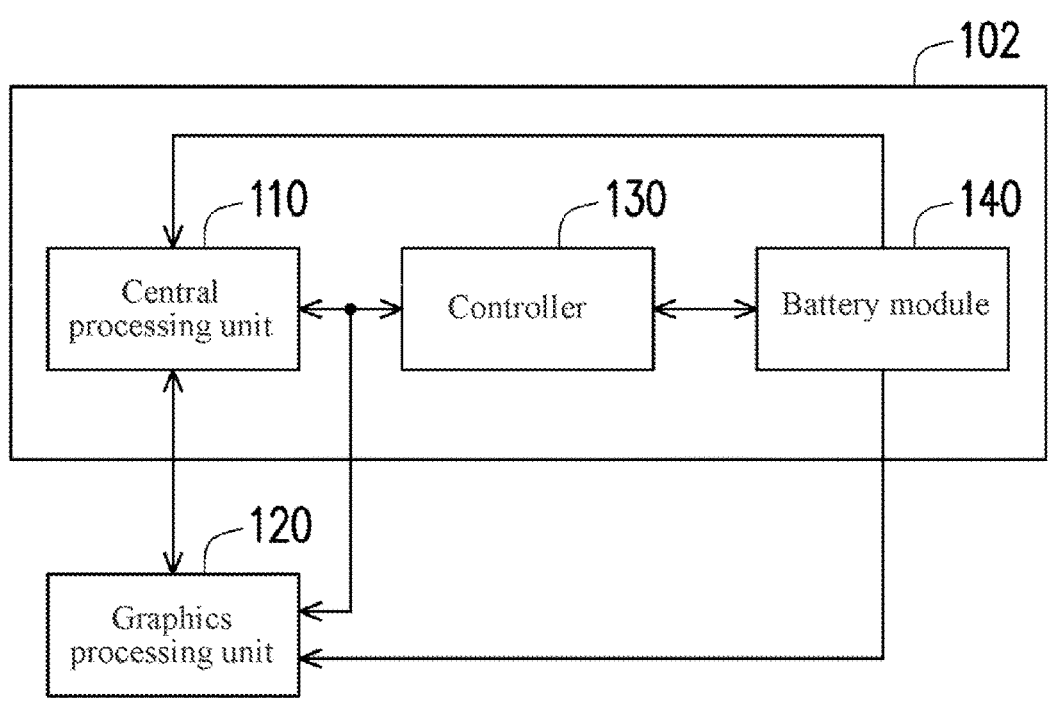
Figure 5C:
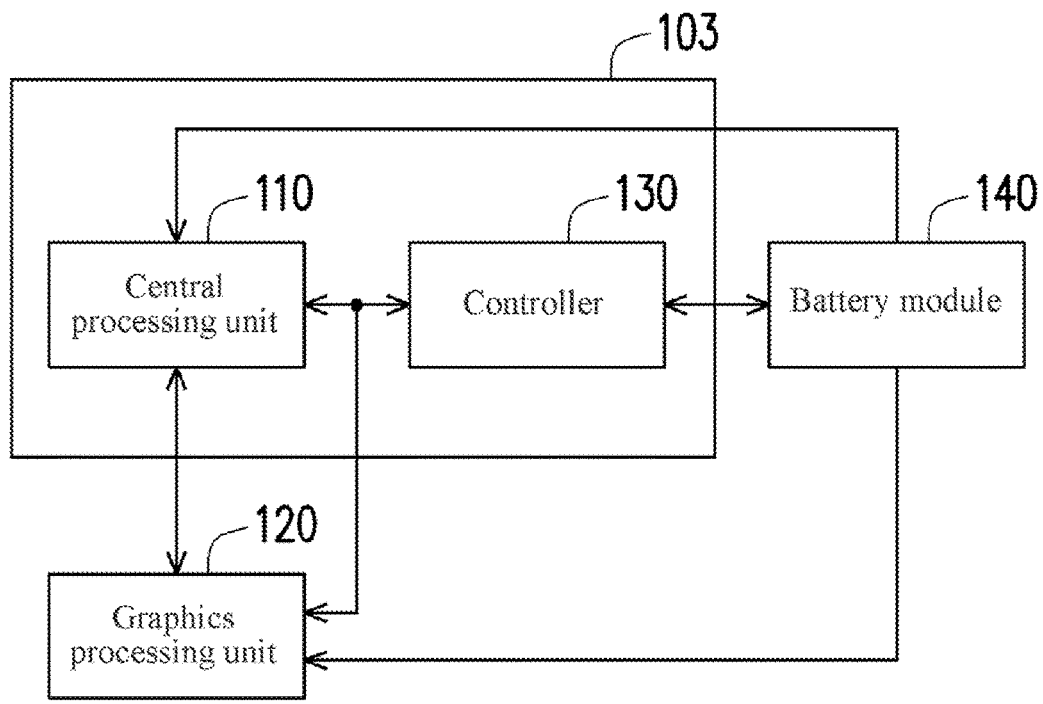
Figure 5D:
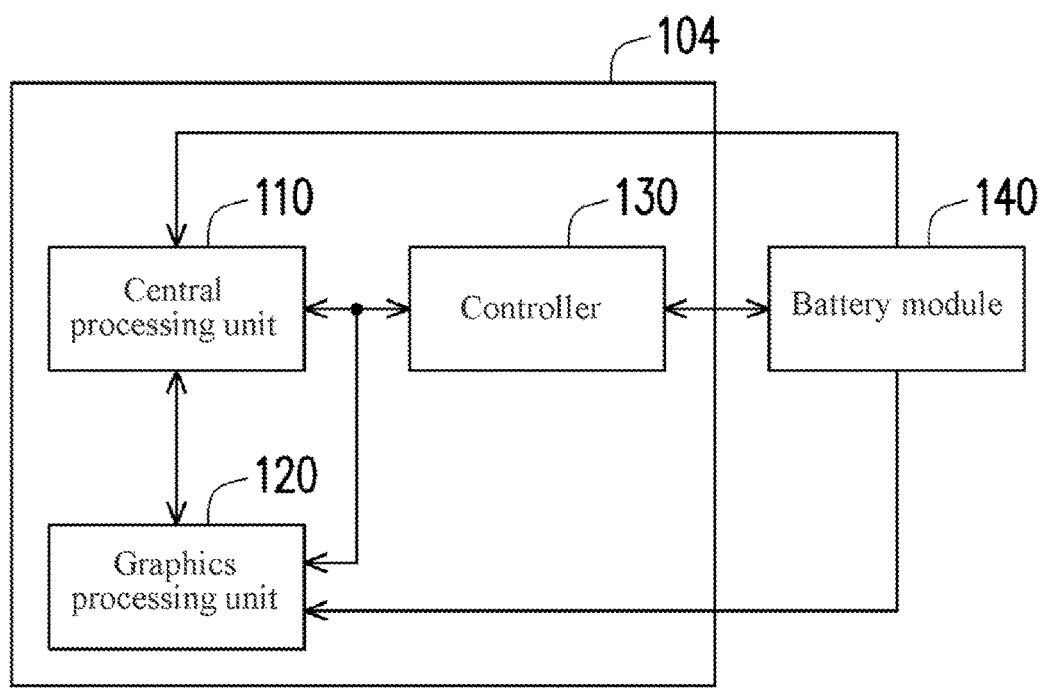

FIG. 5A to FIG. 5D are schematic diagrams of a system of a portable computing device according to an embodiment of the disclosure. Referring to FIG. 5A, a portable computing device 101 includes a CPU 110, a graphics processing unit 120, a controller 130, and a battery module 140. Referring to FIG. 5B, a portable computing device 102 includes a CPU 110, a controller 130, and a battery module 140, where a graphics processing unit 120 is externally connected to the portable computing device 102. Referring to FIG. 5C, a portable computing device 103 includes a CPU 110, a controller 130, and a battery module 140, where a graphics processing unit 120 is externally connected to the portable computing device 103. Referring to FIG. 5C, a portable computing device 104 includes a CPU 110, a graphics processing unit 120, and a controller 130, where a battery module 140 is externally connected to the portable computing device 104.

In summary, in the portable computing device and the performance control method thereof according to the embodiments of the disclosure, when the controller releases performance control of the CPU and the graphics processing unit, the controller gradually switches from the current performance control setting to the maximum performance setting or one of the performance control settings whose performance indexes are higher than that of the current performance control setting. In this way, intelligent dynamic adjustment is performed through the controller to make optimal settings between the system performance and the capability of the battery module, so that program execution remains smooth while the service life of the battery module is ensured, and a better user experience is provided.

Although the disclosure has been described with reference to the above embodiments, the embodiments are not intended to limit the disclosure. A person of ordinary skill in the art makes variations and improvements without departing from the spirit and scope of the disclosure. Therefore, the protection scope of the disclosure is subject to the appended claims.

What is claimed is:

1. A portable computing device, comprising:
a central processing unit (CPU); and
a controller, coupled between the CPU, a graphics processing unit, and a battery module, the controller determines whether to adjust performance of at least one of the CPU or the graphics processing unit according to one or a combination of a battery capacity, a battery power, a battery current, a battery voltage, or a battery temperature of the battery module,
wherein when the controller determines that one or a combination of the battery capacity, the battery power, the battery current, the battery voltage, or the battery temperature of the battery module meets a reduction condition, the reduction condition is reducible and the controller reduces the performance of at least one of the CPU or the graphics processing unit; and
when the controller determines that one or a combination of the battery capacity, the battery power, the battery current, the battery voltage, or the battery temperature of the battery module meets a restoration condition, the controller restores the performance of at least one of the CPU or the graphics processing unit,
wherein the controller further determines whether the portable computing device is operated in a power saving mode, and when the portable computing device is operated in the power saving mode, the controller reduces the reduction condition or reduces an initial value of a rated power consumption of the CPU.

2. The portable computing device according to claim 1, wherein the controller performs a performance control method to adjust the performance of at least one of the CPU or the graphics processing unit, the performance control method comprises a plurality of performance reduction steps and a plurality of performance restoration steps, and each of the performance reduction steps and each of the performance restoration steps respectively correspond to a performance control setting, and when the controller determines to reduce the performance of at least one of the CPU or the graphics processing unit, the controller changes a current performance setting of the CPU and the graphics processing unit from a maximum performance setting to one of the performance control settings by performing at least one of the performance reduction steps, to gradually reduce the performance of at least one of the CPU or the graphics processing unit.

3. The portable computing device according to claim 2, wherein when the controller determines to restore the performance of at least one of the CPU or the graphics processing unit, the controller changes the current performance setting from a current performance control setting in the performance control settings to another performance control setting whose performance index is higher than that of the current performance control setting in the performance control settings by performing at least one of the performance restoration steps, to gradually increase the performance of at least one of the CPU or the graphics processing unit.

4. The portable computing device according to claim 1, wherein the controller further determines whether the portable computing device is operated in a boost mode, wherein when the portable computing device is operated in the boost mode, the controller determines whether the portable computing device turns off the graphics processing unit, and when the portable computing device turns off the graphics processing unit, the controller increases the initial value of the rated power consumption of the CPU.

5. The portable computing device according to claim 4, wherein when the portable computing device does not turn off the graphics processing unit, the controller raises reduction conditions of the CPU and the graphics processing unit.

6. The portable computing device according to claim 1, wherein the controller further determines, according to the battery temperature of the battery module, whether to perform one of reducing a rated power consumption of the graphics processing unit, triggering throttling of the graphics processing unit, reducing a rated power consumption of the CPU, triggering throttling of the CPU, or enabling the portable computing device to enter a dormant state.

7. The portable computing device according to claim 6, wherein the controller determines whether the battery temperature is greater than or equal to a first temperature threshold for a first preset period of time, and when the battery temperature is greater than or equal to the first temperature threshold for the first preset period of time, the controller performs at least one of reducing the rated power consumption of the graphics processing unit or triggering the throttling of the graphics processing unit.

8. The portable computing device according to claim 7, wherein the controller determines whether the battery temperature is greater than or equal to a second temperature threshold for a second preset period of time, and when the battery temperature is greater than or equal to the second temperature threshold for the second preset period of time, the controller performs at least one of reducing the rated power consumption of the CPU or triggering the throttling of the CPU.

9. The portable computing device according to claim 8, wherein the controller determines whether the battery temperature is greater than or equal to a third temperature threshold for a third preset period of time, and when the battery temperature is greater than or equal to the third temperature threshold for the third preset period of time, the controller enables the portable computing device to enter the dormant state.

10. The portable computing device according to claim 9, wherein the third temperature threshold is greater than the second temperature threshold, and the second temperature threshold is greater than the first temperature threshold.

11. The portable computing device according to claim 1, wherein the portable computing device further comprises the graphics processing unit.

12. The portable computing device according to claim 1, wherein the portable computing device further comprises the battery module.

\* \* \* \* \*